United States Patent [19]

Okada

[11] Patent Number: 4,622,234
[45] Date of Patent: Nov. 11, 1986

[54] PROCESS FOR PREPARING A FISH MEAT PRODUCT

[75] Inventor: Minoru Okada, Tokyo, Japan

[73] Assignee: Suzuhiro U.S.A., Inc., Los Angeles, Calif.

[21] Appl. No.: 662,082

[22] Filed: Oct. 18, 1984

Related U.S. Application Data

[63] Continuation of Ser. No. 503,518, Jun. 13, 1983, abandoned.

[51] Int. Cl.[4] ............................................. A23L 1/325
[52] U.S. Cl. .................................... 426/643; 426/513; 426/802
[58] Field of Search ............... 426/104, 272, 533, 643, 426/650, 652, 513, 521, 524, 802, 655, 657, 518

[56] References Cited

U.S. PATENT DOCUMENTS

| | | | |
|---|---|---|---|
| 3,532,512 | 10/1970 | Joaquin | 426/643 X |
| 3,863,017 | 1/1975 | Tueh | 426/513 X |
| 3,870,808 | 3/1975 | Boyer et al. | 426/802 X |
| 3,881,032 | 4/1975 | Matsumoto et al. | 426/643 |
| 3,920,853 | 11/1975 | Middendorf et al. | 426/802 X |
| 4,084,017 | 4/1978 | Kim et al. | 426/802 X |
| 4,158,065 | 6/1979 | Sugino | 426/104 |

FOREIGN PATENT DOCUMENTS

| | | | |
|---|---|---|---|
| 38187 | 4/1981 | Japan . | |
| 1518778 | 7/1978 | United Kingdom | 426/643 |

Primary Examiner—Arthur L. Corbin
Attorney, Agent, or Firm—William W. Haefliger

[57] ABSTRACT

This invention relates to preparation of a fish meat product, as for example imitation abalone, from comminuted fish meat which may include shell fish. Fish meat is ground with additives such as salt and suitable flavoring materials to form a sticky paste, and then formed into any desired shape, such as abalone shape. The molded meat mass is set into elastic gel form at a temperature 0° to 40° C., then frozen slowly at a temperature of −5° to −30° C., and subsequently heated to at least 70° C. to sterilize.

5 Claims, 4 Drawing Figures

PROCESS FOR PREPARING A FISH MEAT PRODUCT

This is continuation of application Ser. No. 503,518, filed June 13, 1983, now abandoned.

BACKGROUND OF THE INVENTION

The present invention relates to an unique seafood product similar to abalone, and to a method for making that product from comminuted fish meat and shellfish.

The process of mechanically deboning of fish meat has received increasing attention during the last twenty years throughout the world in order to utilize efficiently nutritious proteinaceous resources, such as numerous underutilized marine species. Many efforts have been made recently to produce more expensive, more attractive, more acceptable fabricated products for human consumption from mechanically deboned fish meat. Simulated meat products of crab, shrimp and scallop have been marketed with great success during recent years.

Abalone is well known for its delicate flavor and distinctive texture. The availability of abalone has decreased rapidly in recent years and become an increasingly rare and expensive product, in both restaurants and markets. No satisfactory way was known to provide a method for making an artificial seafood product resembling relatively rare and expensive seafood products such as abalone from inexpensive and underutilized marine species.

U.S. Pat. No. 3,532,512 discloses a simulated seafood product, the attempt being to simulate abalone. In the disclosed method, two portions of raw scallops, one of which is ground and the other of which is shredded into its natural muscle fibers, are mixed and combined with a quantity of animal gelatin and flattened to uniform thickness. The restructured product made by the disclosed process simulates abalone in appearance and flavor, but its texture is quite different from natural abalone meat; the texture is undesirably soft and mushy, and the product lacks distinctive bite characteristics of abalone meat. In addition, scallop has become too expensive for use as feed stock.

Many Japanese Kamaboko manufacturers have tried to make imitation abalone product from deboned fish meat for many years, particularly by using their technology for enhancing the elasticity of Kamaboko. Such technology utilizes a setting method in which ground fish meat, with salt, is set to elastic jelly condition. Application of the setting method is very effective to increase elasticity and cohesiveness of Kamaboko products, but from the standpoint of making imitation abalone, the resulting products are so tough and rubbery that the texture is quite different from that of natural cooked abalone.

SUMMARY OF THE INVENTION

The key to imitation abalone making is how to give the product the distinctive texture of abalone, excellent bite characteristics, good cohesiveness and moderate tenderness, and how to remove undesirable rubbery bite characteristics from the product.

The present invention is directed to a process for producing an imitation abalone meat product from comminuted meat of fish and shellfish, and embodying such desirable qualities.

In the method, mechanically deboned fish meat and/or comminuted meat of shellfish, is ground with additives such as salt, suitable flavoring, seasoning and other ingredients to form a sticky paste. The paste mass is then formed into any desired shape, such as the shape of individual unshelled abalone, or the shape of a loaf the cross section of which simulates that of natural abalone. The formed paste mass is held in a chamber at a temperature of 0° to 40° C. to set thickness to elastic gel. The set mass is then frozen slowly at a temperature of $-5°$ to $-30°$ C. to remove undesirable rubbery bite characteristics and to increase the distinctive texture so as to closely resemble that of natural cooked abalone. The frozen meat mass is then heated rapidly to at least 70° C. for sterilization. The product may be packed and frozen or may be sterilized in a retort at a temperature of 110° to 130° C. so that it will keep under ambient conditions and not spoil until the ultimate consumer is ready to use the product.

These and other objects and advantages of the invention, as well as the details of an illustrative embodiment, will be more fully understood from the following description and drawings, in which:

DRAWING DESCRIPTION

FIG. 1 is a flow diagram;
FIGS. 2 and 3 are perspective views of slicable meat masses; and
FIG. 4 is a graph.

DETAILED DESCRIPTION

Figure 1:
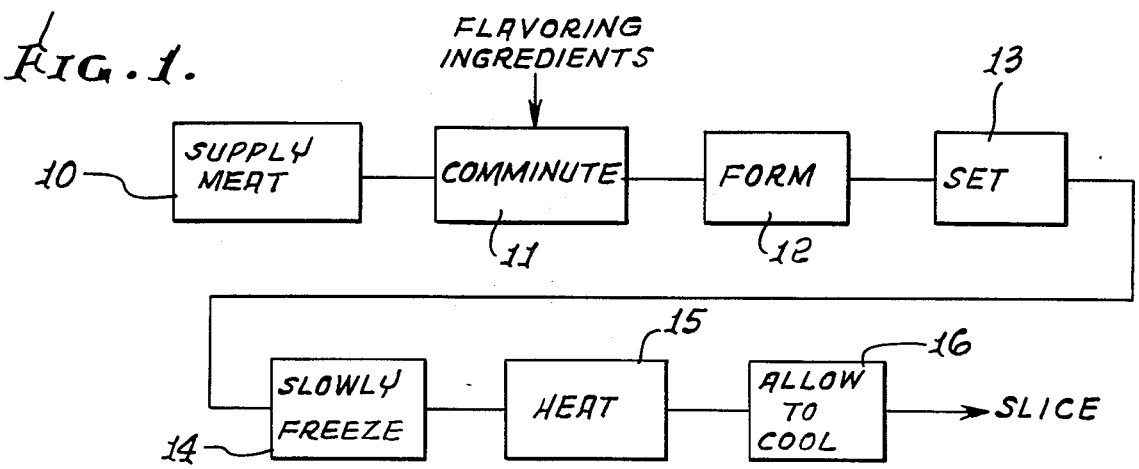

In accordance with the present invention, it is found that an unique product having good cohesiveness and excellent bite characteristics, closely simulating that of cooked abalone meat, can be prepared from ground fish meat paste. Meat of various aquatic species such as ocean fish, shrimp, squid and clam may be employed for the invention. Fish meat with excellent setting capability such as Alaska pollack and jack mackerel is preferably and most desirably used for the principal component.

Ground meat paste may be prepared by finely comminuting deboned or deshelled fish meat in any type of apparatus, to form a fine mince, and meat proteins are dissolved by the action of added salt. Examples of apparatus that have been found to work satisfactorily are a cutter mixer for sausage preparation and stone mortar widely used in Japanese Kamaboko plants. During the comminuting step, the meat material is maintained at a reduced temperature such as below 20° C. and above 0° C. It is preferred to add salt (sodium chloride) to the meat in an amount of from 1.0 to 10 percent, and preferably and most desirably 2.0 to 3.5 percent, by weight of the meat. The flavor of the product can be made to closely resemble real abalone by adding small amounts of abalone extractives and chemical seasonings such as glycine, alanine, monosodium glutamate and sodium succinate which are abundant in abalone. Caramel may be used as a coloring material. Other desirable ingredients may be added such as starch, egg white, isolated soy protein etc.

The ground sticky paste is packed into a forming mold the shape of which simulates that of a whole cooked abalone, or into a loaf shaped mold the cross section of which is similar to that of cooked abalone. The formed meat mass is thereafter set to elastic gel condition by allowing the mass to stand in a constant temperature chamber at a temperature of 0° to 40° C.

and for a selected time between 10 and 60 minutes. The standing time varies with species of raw fish materials, ingredients added, and standing temperature. Thus, the meat mass may preferably stand in the chamber until it loses its stickyness and turns into elastic gel. For example, a meat mass made from Alaska pollack begins to set after 10 minutes standing at 40° C., and better results were obtained with the same meat mass allowed to stand for longer than 30 minutes at 40° C. (i.e. between 30 and 50 minutes).

The set meat mass is then frozen slowly after releasing from the mold. Slow freezing removes rubbery bite characteristics and imparts distinctive bite characteristics of cooked real abalone. If the meat mass is frozen quickly in an air blast freezer or in a contact plate freezer as commonly used for freezing sea foods, the product has very elastic texture similar to that of Kamaboko but lacks distinctive bite characteristics of abalone. It is preferable to freeze the set meat mass at a temperature of −5° to −30° C. for more than 5 hours, and most desirably −10° to −20° C. for 15 to 24 hours considering the daily work schedule.

The frozen meat mass is thereafter immediately heated for sterilization in a steam chamber, typically at a temperature over 70° C., and typically 80° to 130° C. Complete thawing of the frozen meat mass, before placement in the steam chamber for sterilization is to be avoided, because undesirable rubbery bite characteristics may recur. The frozen meat mass can be stored at a temperature below −20° C. for several months before sterilization cooking, if necessary.

The products obtained by the present invention have texture and flavor simulating very closely a cooked real abalone, and can be table served easily after slicing. The products may be stored in frozen state for a long period. The product may be further sterilized without any textural changes in a retort at a temperature of 110° to 130° C. for subsequent ambient temperature packing in the form of canned product or retort pouch products.

The following examples further illustrate various features of the invention, but are intented to in no way limit the scope of the invention, which is defined in the appended claims:

EXAMPLE 1

Two kilograms of mechanically deboned Alaska pollack meat were ground for 30 minutes with 50 g salt, 400 g water, 100 g potato starch, 4 g monosodium glutamate, 5 g glycine and 2 g sodium succinate in a stone mortar. Each two hundred grams of comminuted meat was then placed in a metal abalone shaped mold and samples were treated according to the following procedures, in four different step orders.

Setting process: The meat mass was kept for 1 hour in a steam chamber at 40° C.
Heating process: The meat mass was kept for 1 hour in a steam chamber at 85° C.
Freezing process: The meat mass was kept for 15 hours in a cold room at −20° C.

After thawing or cooling, the texture of the products was examined organoleptically. The results obtained are shown in below Table 1

TABLE 1

| Sample number | Treatment | Texture of product |
| --- | --- | --- |
| 1 | no setting-heating-freezing | Kamaboko with rubbery bite characteristics |

TABLE 1-continued

| Sample number | Treatment | Texture of product |
| --- | --- | --- |
| 2 | no setting-freezing-heating | Meat mass with flaky texture |
| 3 | setting-heating-freezing | Kamaboko with extremely rubbery characteristics |
| 4 | setting-freezing-heating | Meat mass with distinctive bite characteristic resembling that of abalone |

The product of sample No. 4 treated in accordance with the present invention alone had a texture resembling that of abalone.

EXAMPLE 2

The same comminuted meat described in Example 1 was molded in the shape of an abalone and set for 1 hour in a steam chamber at 40° C. Samples of the set meat mass were frozen under three different conditions and then stored for 48 hours at −20° C. The frozen meat masses were heated for 90 minutes in a steam chamber at 90° C. The textures of the products were examined organoleptically and the results obtained were shown in Table 2.

TABLE 2

| Sample number | Freezing process | Texture of product |
| --- | --- | --- |
| 5 | −20° C. for 15 hours in a cold room | Meat mass with distinctive bite characteristics of abalone |
| 6 | −30° C. for 2 hours in an air blast freezer | Kamaboko with rubbery bite characteristics |
| 7 | −80° C. for 30 minutes in a liquid nitrogen freezer | Kamaboko with very rubbery bite characteristics |

Slow freezing was found to be important to make acceptable imitation abalone products.

EXAMPLE 3

Ten kilograms of mechanically deboned meat of Alaska pollack were ground for 20 minutes with 200 g salt, 2 Kg water, 500 g potato starch, 300 g abalone extractives, 30 g glycine, 30 g alanine and 10 g caramel, in a cutter mixer. The ground meat was packed in a long metal mold (height 5 cm, wide 6 cm, length 25 cm) the cross section of which resembled that of cooked abalone, and then allowed to set for 1 hour at 40° C. in a steam chamber. The set meat mass was then removed from the mold and allowed to slowly freeze for 18 hours at −15° C. in a cold chamber. The frozen meat mass was cooked immediately for 90 minutes at 90° C. in a steam chamber. After cooling, the meat mass was sliced into a thin pieces of 3 mm thickness. In order to make a product distributable under ambient conditions, the sliced products were packed into a laminated plastic film bag for retort pouched foods, vacuum sealed, and then heated for 30 minutes at 120° C. in a retort. The product was slightly brown colored and had texture and flavor closely resembling those qualities of a sliced cooked abalone.

FIG. 1 shows the steps of the method, in flow diagram form, the steps numbered 10–16 as illustrated.

Figure 2:
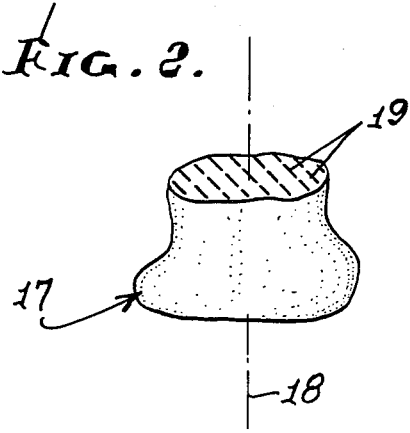

FIG. 2 shows a meat mass 17 formed as at 12 in FIG. 1 to have circular shape about axis 18. After steps 13–16, the mass may be sliced parallel to axis 18, as indicated by slice planes 19, so that the slices have abalone shape, i.e. bulging at one end.

Figure 3:
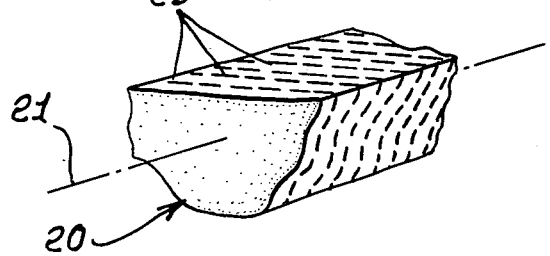

FIG. 3 shows a meat mass 20 as formed at 12 in FIG. 1, to have elongated shape along axis 21. After steps 13-18, the mass is sliced perpendicular to axis 21, as indicated by slice planes 23, so that the slices have abalone shape, i.e. bulging at one end.

Figure 4:
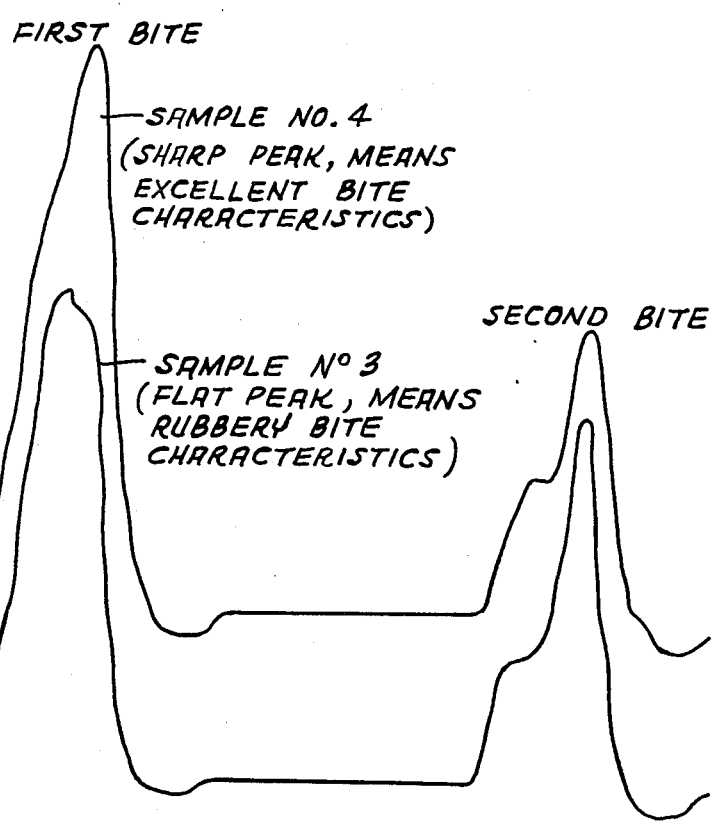

FIG. 4 is a bite characteristic graph, showing Table 1 sample 3 and 4 bite characteristics (first and second bites).

I claim:

1. A process for producing an edible fish meat product, comprising the steps of:
   (a) comminuting fish meat to form a paste mass at a temperature below 20° C. and above 0° C.,
   (b) adding to the mass an amount of sodium chloride which is between 1.0 and 10.0 percent by weight of the mass, and molding the paste mass to abalone shape,
   (c) subjecting the formed mass to a temperature or temperatures between 0° and 40° C. for between 10 and 60 minutes to cause the mass to set to an elastic gel,
   (d) slowly freezing the set mass at a temperature or temperatures between −5° and −30° C. for between 15 and 24 hours to remove rubbery bite characteristics,
   (e) thereafter immediately rapidly heating the frozen mass in a steam chamber to a temperature between 110° and 130° C. to effect sterilization of the mass,
   (f) and then allowing the heated mass to cool and slicing the mass to form thin slices.

2. The process of claim 1 wherein a substance selected from the group consisting of flavoring and seasoning is also added to the mass prior to to said molding step.

3. The process of claim 2 wherein said substance is selected to impart the taste of abalone to the product.

4. The process of claim 1 including adding to the mass, prior to said molding step, small amounts of at least one of the substances selected from the following group:
   (i) abalone extract
   (ii) glycine
   (iii) alanine
   (iv) monosodium glutamate
   (v) sodium succinate
   (vi) caramel
   (vii) starch
   (viii) egg white
   (ix) soy protein.

5. The process for producing an edible fish product resembling abalone, comprising the steps of grinding and mixing 10 kilograms of mechanically deboned fish meat with 200 g salt 2 Kg water 500 g potato starch, 300 g abalone extractive, 30 g glycine, 30 g alanine, and 10 g caramel; packing the ground meant in a metal mold the cross section of which resembles that of cooked abalone; allowing the packed meat to set for about 1 hour at about 40° C. in a steam chamber; removing the then set meat mass from the mold and allowing it to slowly freeze for about 18 hours at about −15° C. in a cold chamber; immediately cooking the meat mass for about 90 minutes at about 90° C. in a steam chamber; cooling the meat mass and slicing it into thin pieces which are then packed in a plastic film and vacuum sealed; and then heating the packed pieces for about 30 minutes at about 120° C. in a retort.

* * * * *